US008336687B2

(12) United States Patent
Kawabata et al.

(10) Patent No.: US 8,336,687 B2
(45) Date of Patent: Dec. 25, 2012

(54) VIBRATION CONTROL APPARATUS, WIND TURBINE GENERATOR AND VIBRATION CONTROL METHOD

(75) Inventors: Minoru Kawabata, Tokyo (JP); Keisuke Sasajima, Tokyo (JP); Atsushi Kubo, Hiroshima (JP); Hideaki Harada, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 42 days.

(21) Appl. No.: 13/152,554

(22) Filed: Jun. 3, 2011

(65) Prior Publication Data

US 2012/0267207 A1 Oct. 25, 2012

Related U.S. Application Data

(63) Continuation of application No. PCT/JP2011/059932, filed on Apr. 22, 2011.

(51) Int. Cl.
 *F16F 7/10* (2006.01)
(52) U.S. Cl. ........ 188/379; 188/378; 188/380; 188/381; 52/167.1; 52/167.2; 52/167.6; 52/167.8; 248/550; 248/559; 248/618; 248/636; 248/638; 267/136; 267/141; 415/4.3; 415/4.5; 415/908; 416/119; 416/145; 416/244 A; 416/500
(58) Field of Classification Search .................. 188/378, 188/379, 322.11; 267/140.2; 416/145; 248/618, 248/638; 52/167.1–167.4, 167.6–167.8; F03D 11/00; F16F 15/02
See application file for complete search history.

(56) References Cited

U.S. PATENT DOCUMENTS

| 8,021,101 B2 * | 9/2011 | Segovia et al. ................ 415/4.3 |
| 2008/0048069 A1 * | 2/2008 | Zheng et al. ............... 244/171.7 |
| 2010/0219642 A1 | 9/2010 | Kim et al. |
| 2010/0243392 A1 * | 9/2010 | Sloth ............................ 188/378 |
| 2010/0276932 A1 | 11/2010 | Numajiri |
| 2012/0063915 A1 * | 3/2012 | Kawabata et al. ........ 416/244 R |

FOREIGN PATENT DOCUMENTS

| JP | 4008944 A | 1/1992 |
| JP | 04366043 A * | 12/1992 |

(Continued)

OTHER PUBLICATIONS

ISR for PCT/JP2011/059932 mailed Mar. 1, 2011.

*Primary Examiner* — Robert A Siconolfi
*Assistant Examiner* — San Aung
(74) *Attorney, Agent, or Firm* — Lowe Hauptman Ham & Berner LLP

(57) ABSTRACT

It is intended to provide a vibration control apparatus that can be installed in a small pace and can be produced at low cost, as well as a wind turbine generator equipped with the vibration control apparatus and a vibration control method. The vibration control apparatus 7 includes a first vibration system 10 of inverted-pendulum type, second vibration systems 20 of inverted-pendulum type which are provided on both sides of the first vibration system 10, a restraining unit 30 which restrains a first weight 11 of the first vibration system 10 and a second weight 21 of the second vibration system 20 and a damper which damps vibration of the first weight 11 and the second weight 21. The vibration control apparatus 7 is installed on an upper floor 8a of a plurality of floors 8.

12 Claims, 8 Drawing Sheets

FOREIGN PATENT DOCUMENTS

| | | | |
|---|---|---|---|
| JP | 05187482 A * | 7/1993 | |
| JP | 11037212 A | 2/1999 | |
| JP | 2000310276 A | 11/2000 | |
| JP | 2001124136 A * | 5/2001 | |
| JP | 2005114070 A | 4/2005 | |
| JP | 2006249982 A | 9/2006 | |
| JP | 2008546948 A | 12/2008 | |
| JP | 2009114977 A | 5/2009 | |
| JP | 2009150319 A | 7/2009 | |
| WO | 2010070768 A1 | 6/2010 | |

* cited by examiner

Enlarged view of the area D

B - B View

C - C View

| l(m) | k(N/m) | m1(kg) | m2(kg) | m1+m2(kg) | f(Hz) |
|---|---|---|---|---|---|
| 0.5 | 394784.2 | 10000 | 0 | 10000 | 1.000 |
| 0.5 | 394784.2 | 9000 | 1000 | 10000 | 0.975 |
| 0.5 | 394784.2 | 8000 | 2000 | 10000 | 0.949 |
| 0.5 | 394784.2 | 7000 | 3000 | 10000 | 0.922 |
| 0.5 | 394784.2 | 6000 | 4000 | 10000 | 0.895 |
| 0.5 | 394784.2 | 5000 | 5000 | 10000 | 0.867 |
| 0.5 | 394784.2 | 4000 | 6000 | 10000 | 0.838 |
| 0.5 | 394784.2 | 3000 | 7000 | 10000 | 0.808 |
| 0.5 | 394784.2 | 2000 | 8000 | 10000 | 0.776 |
| 0.5 | 394784.2 | 1000 | 9000 | 10000 | 0.743 |

Enlarged view of area E

VIBRATION CONTROL APPARATUS, WIND TURBINE GENERATOR AND VIBRATION CONTROL METHOD

TECHNICAL FIELD

The present invention relates to a vibration control apparatus and a vibration control method for damping vibration of a structure as well as a wind turbine generator.

BACKGROUND ART

A damping device is normally used to damp the vibration of the structure. For instance, Patent Literature 1 discloses a vibration control apparatus having a damping unit of an inverted pendulum type. The vibration control apparatus includes a weight mass, a rod which is installed upright to support the weight like an inverted pendulum, a supporting member which supports the middle part of the rod as a supporting point of the inverted pendulum, a drive unit which moves a lower end of the rod in a desired direction and a spring whose one end is connected to the rod and whose other end is connected to an object whose vibration is controlled.

For instance, another vibration control apparatus is described in Patent Literature 2. The vibration control apparatus includes a pendulum damping unit and an inverted-pendulum damping unit. The pendulum damping unit has a first weight suspended from the top of the object to be controlled. The inverted pendulum dumping unit has a second weight supported by a rod installed upright on the bottom of the object. The first and second weight are freely movable in a vertical direction and are interlocked by a connection member for moving the first and second weights in conjunction in a horizontal direction.

Yet another vibration control apparatus is described in Patent Literature 3. The vibration control apparatus includes an inverted-pendulum damping unit and a rotation damping unit utilizing rotatory inertia. The inverted-pendulum damping unit is installed upright on the bottom of the object to support a weight by a multiple layers of laminated rubbers. The rotation damping unit has a shaft which rotates while moving in a horizontal direction in conjunction with a movement of a weight unit having a plurality of weights connected thereto, a cable winded around the shaft and a cable mount to which both ends of the cable are connected via a linear guide.

CITATION LIST

Patent Literature

[PTL 1]
JP4-008944A
[PTL 2]
JP11-037212A
[PTL 3]
JP2000-310276A

SUMMARY OF INVENTION

Technical Problem

Recently, the wind turbine generators are getting larger in pursuit of higher power generation efficiency. Some wind turbine generators are over 100 m in hub height (height from the ground to the center of the hub). In response to the increased size of the wind turbine generator, a natural period of the first natural frequency of a tower increases. When the period of the first natural frequency of the tower coincides with a resonance zone of the rotor rotation, the fatigue load on the tower increases substantially. Thus, it is necessary to install a vibration control apparatus in the wind turbine generator.

The inside the tower of the wind turbine generator is occupied by a hoistway or stairway which the workers use to perform maintenance of the nacelle installed on the tower and a variety of pipes and cables. This leaves a limited space for installing the vibration control apparatus.

The vibration control apparatus of Patent Literature 1 and Patent Literature 2 requires a large space for installation. Thus, it is difficult to install the vibration control apparatus of Patent Literature 1 and Patent Literature 2 inside the tower of the wind turbine generator.

The vibration control apparatus of Patent Literature 3 has a reduced height enough to be installed in a small space. However, it requires machining with high precision so that the weight unit and the shaft can smoothly rotate. Thus, the production of the vibration control apparatus is expensive.

In view of the problems above, it is an object of the present invention is to provide a vibration control apparatus that can be installed in a small space and can be produced at low cost, as well as a wind turbine generator equipped with the vibration control apparatus and a vibration control method.

Solution to Problem

To solve the problems described above, the present invention provides a vibration control apparatus for a structure. The vibration control apparatus may include, but is not limited to: a first vibration system which comprises a first weight, a supporting bar installed upright on the structure to support the first weight on the structure, a lower universal joint connecting a lower end of the support bar to the structure and an upper universal joint connecting an upper end of the support bar to the first weight; a second vibration system which comprises an elastic member installed upright on the structure and a second weight arranged on the elastic member; and a restraining unit which restrains the first weight with respect to the second weight such that the first and second weights move in the same direction on the same horizontal plane and the first weight moves relative to the second weight in a vertical direction.

According to the above vibration control apparatus, the first weight and the second weight are supported from underneath by the supporting bar and the elastic member respectively. Thus, it is possible to control the height of the device in comparison to the conventional control apparatus having the pendulum-type damping unit in which the weight is suspended from the structure via the suspension member and the inverted-pendulum damping unit in which another weight is supported by the supporting bar.

The first vibration system and the second vibration system can be manufactured by using general parts without using special materials and thus, the control apparatus can be manufactured at low cost. The replacement parts are easily-available for maintenance or the like, as the general parts are used.

In the above vibration control apparatus for the structure, the first vibration system and the second vibration system move on the same horizontal plane in the same direction and the first vibration system moves relative to the second vibration system in the vertical direction. Specifically, the first and second vibration systems are integrated such as to restrain a degree of horizontal-movement freedom without restraining a degree of vertical-movement freedom. In this manner, it is easy to adjust the oscillation cycle of the vibration control apparatus by changing the weight ratio of the first weight and second weight while the vertical movement thereof is unrestricted.

The restraining unit may include, but is not limited to, a frame which surrounds the first weight and a plurality of sliding members which are provided between an outer periphery of the first weight and an inner periphery of the frame.

According to the above restraining unit, the sliding members are provided between the frame of the second weight and the first weight so that the second weight moves smoothly relative to the first weight in the vertical direction. The frame of the second weight surrounds the first weight and thus, the first weight and the second weight move together in the same direction on the same horizontal plane. In this manner, the first weight and the second weight move together in the same direction on the same horizontal plane and the first weight moves relative to the second weight in the vertical direction.

At least one of the first and second weights may be formed by a plurality of weight pieces each of which is detachable.

At least one of the first and second weights is formed by detachable weight pieces. Thus, it is possible to adjust the natural frequency of the vibration control apparatus by changing the weight ratio of the first weight and second weight, specifically by changing the number of the weight pieces of at least one of the first weight and second weight.

In the above vibration control apparatus, the first and second vibration systems are integrated such as to restrain a degree of horizontal-movement freedom without restraining a degree of vertical-movement freedom. In this manner, it is easy to adjust the oscillation cycle of the vibration control apparatus by changing the weight ratio of the first weight and second weight while the vertical movement thereof is unrestricted.

For instance, when the first natural frequency varies in installation stages such as a stage of constructing a low tier of the structure, a stage of constructing a middle tier and a stage of constructing a top tier, the vibration control apparatus can adjust the natural frequency. Thus, it is possible to efficiently damp the vibration occurring in each of the stages by installing the vibration control apparatus in course of construction of the structure. For instance, in the case of the wind turbine generator, installing of the vibration control apparatus in the stage of structuring the tower is particularly advantageous in stages such as a stage of structuring the tower and a stage of installing the nacelle to the tower.

At least one of the first and second weights is formed by the detachable weight pieces. Thus, it is easy to adjust the oscillation cycle by changing the number of the detachable weight pieces of the one of the first and second weights and workers with general skill can perform the process without using any special tool. Therefore, it is unnecessary to arrange a skilled operator or special tool to adjust the oscillation cycle.

The structure may be a wind turbine generator. In such case, it is possible to damp the first natural vibration of the tower due to the rotation of the blades of the wind turbine generator. Therefore, the wind turbine generator having the hub which is over 100 m height, is easily achievable while avoiding the increase of the weight and a wall thickness of the tower and maintaining an appearance and inside structure of the tower.

When the structure is the wind turbine generator, the vibration control apparatus is installed in a tower of the wind turbine generator, and a pair of the second vibration systems may be provided on both sides of the first vibration system in a circumferential direction of the tower, and a frame and a plurality of sliding members may be provided between the pair of the second vibration systems, the frame being integrally formed with the second weight to surround the first weight, each of the sliding members being arranged between the first weight and the frame.

According to the above vibration control, the pair of second vibration systems are provided on both sides of the first vibration system in the circumference direction of the tower. Thus, the vibration control apparatus is substantially shaped into an arc formed along the inner wall of the tower. It is possible to install the arc-shaped vibration control in a small space between the inner wall of the tower and an outer periphery of a stairway which is generally arranged in the center of the tower.

It is also preferable that a weight ratio of the first weight to the second weight is changed to adjust a oscillation cycle of a main body of the vibration control apparatus without changing a total weight of the first and second weights.

In this manner, the oscillation cycle of the main body of the vibration control apparatus can be adjusted without changing the total weight of the first and second weights. Thus, it is unnecessary to add a separate weight to adjust the oscillation cycle.

The vibration control apparatus may also include a damper one end of which is connected to the structure and other end of which is connected to one of the first and second weights.

The one end of the damper is connected to the structure and the other end of the damper is connected to one of the first and second weights. Thus, it is possible to enhance the damping effect on the horizontal vibration of the first and second weights.

It is also preferable that the damper is arranged horizontally.

With the damper installed horizontally, it is possible to enhance the damping effect on the horizontal vibration.

The wind turbine generator in relation to the present invention may include, but is not limited to, the vibration control apparatus described above. In such case, it is possible to damp the first natural vibration of the tower due to the rotation of the blades of the wind turbine generator. Therefore, the wind turbine generator having the hub which is over 100 m height, is easily achievable without increasing the weight and a wall thickness of the tower.

The vibration control apparatus may be installed on an upper floor of the tower of the wind turbine generator. In such case, in comparison to the case of the vibration control apparatus being installed on a middle floor or a lower floor of the tower of the wind turbine generator, it is possible to efficiently damp the first natural vibration of the tower.

The present invention provides a vibration control method for a structure. The vibration control method may include, but is not limited to, the steps of:

installing upright a first vibration system comprising a support bar and a first weight on the structure by connecting one end of the support bar to the structure, the supporting bar being connected to a universal joint at both ends of the supporting bar, the first weight being coupled to other end of the support bar via the universal joint;

installing upright a second vibration system comprising an elastic member and a second weight on the structure by connecting one end of the elastic member to the structure, the second weight being connected to other end of the elastic member;

restraining the first weight with respect to the second weight by a restraining unit; and when the structure shakes, oscillating the first and second weights such that the first and second weights move in the same direction on the same plane and the first weight moves relative to the second weight in a vertical direction.

According to the vibration control method, the first and second vibration systems are installed upright on the structure and the first and second weights move on the same horizontal plane in the same direction while the first weight moves relative to the second weight in the vertical direction. Thus, it is possible to enhance the damping effect on the first natural vibration of the structure.

In the above vibration control method, at least one of the first and second weights may be formed by a plurality of weight pieces each of which is detachable, and the vibration control method may include the step of changing a number of the weight pieces of at least one of the first and second weights to change a weight ratio of the first weight to the second weight.

In this manner, the number of weight pieces of at least one of the first and second weights is changed to change the weight ratio of the first and second weight, thereby adjusting the natural frequency of the vibration control as a whole having the first and second vibration systems. Therefore, it is possible, for instance, to damp the vibration of the structure according to the first natural frequency which varies in installation stages such as a stage of constructing a low tier of the structure, a stage of constructing a middle tier and a stage of constructing a top tier. For instance, in the case of the wind turbine generator, installing of the vibration control apparatus in the stage of structuring the tower is particularly advantageous in stages such as a stage of structuring the tower, a stage of installing the nacelle to the tower and a stage of installing the rotor to the nacelle.

Advantageous Effects of Invention

According to the present invention, the first weight and the second weight are supported from underneath by the supporting bar and the elastic member respectively. Thus, it is possible to reduce the height of the vibration control apparatus and also to manufacture the vibration control apparatus at low cost.

DESCRIPTION OF EMBODIMENTS

A preferred embodiment of the present invention will now be described in detail with reference to the accompanying drawings. Exemplary cases of applying a vibration control apparatus to a wind turbine generator are explained hereinafter. It is also possible to apply the vibration control apparatus to any structure that requires a vibration control function such as a building, a plant, a bridge, a tower and a crane. It is intended, however, that unless particularly specified, dimensions, materials, shape, its relative positions and the like shall be interpreted as illustrative only and not limitative of the scope of the present invention.

Figure 1:
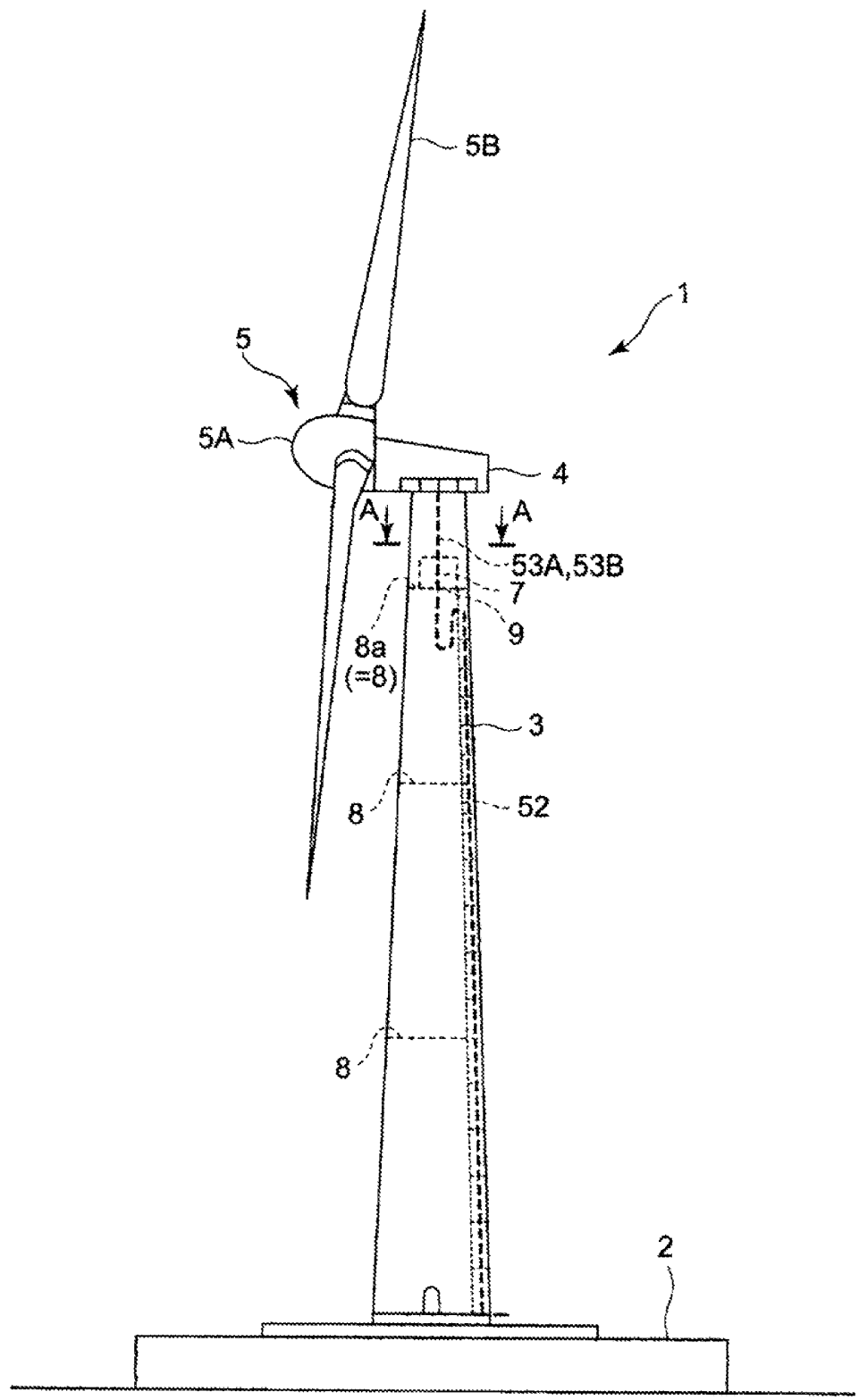
FIG. 1 is a side view illustrating a wind turbine generator in relation to a first preferred embodiment of the present invention.

FIG. 1 is a side view of a wind turbine generator 1 in relation to a first preferred embodiment of the present invention.

FIG. 1 shows the wind turbine generator 1 which has a tower 3 installed on a base 2, a nacelle 4 installed on an upper end of the tower 3, a rotor 5 having a plurality of blades 5B installed radially to a hub 5A and a vibration control apparatus 7 installed on an upper floor 8a of a plurality of floors 8 inside the tower 3.

The upper floor 8a has an opening 9 in the center area. In the opening 9, a cable 53A, another cable 53B and a ladder 52 are inserted. The cable 53A supplies electric power and a control signal to a generator and a related device inside the nacelle 4. The cable 53B supplies electric power from the generator to a power grid. The cables 53A and 53B and the ladder 52 are arranged along an inner wall of the tower 3 between the base 2 and the upper floor 8a.

The wind turbine generator 1 converts a force of the wind against the blade 5B to a power to rotate the rotor 5 around a rotation shaft. In such case, when the first natural frequency of the tower 3 coincides with the frequency of vibration accompanied by the rotation of the rotor 5, it may cause the tower 3 and the rotor 5 to resonate. In the preferred embodiment, the vibration control apparatus 7 is provided to damp the vibration of the tower 3 within a permissible range even when the rotor 5 and the tower 3 resonate.

Figure 2:
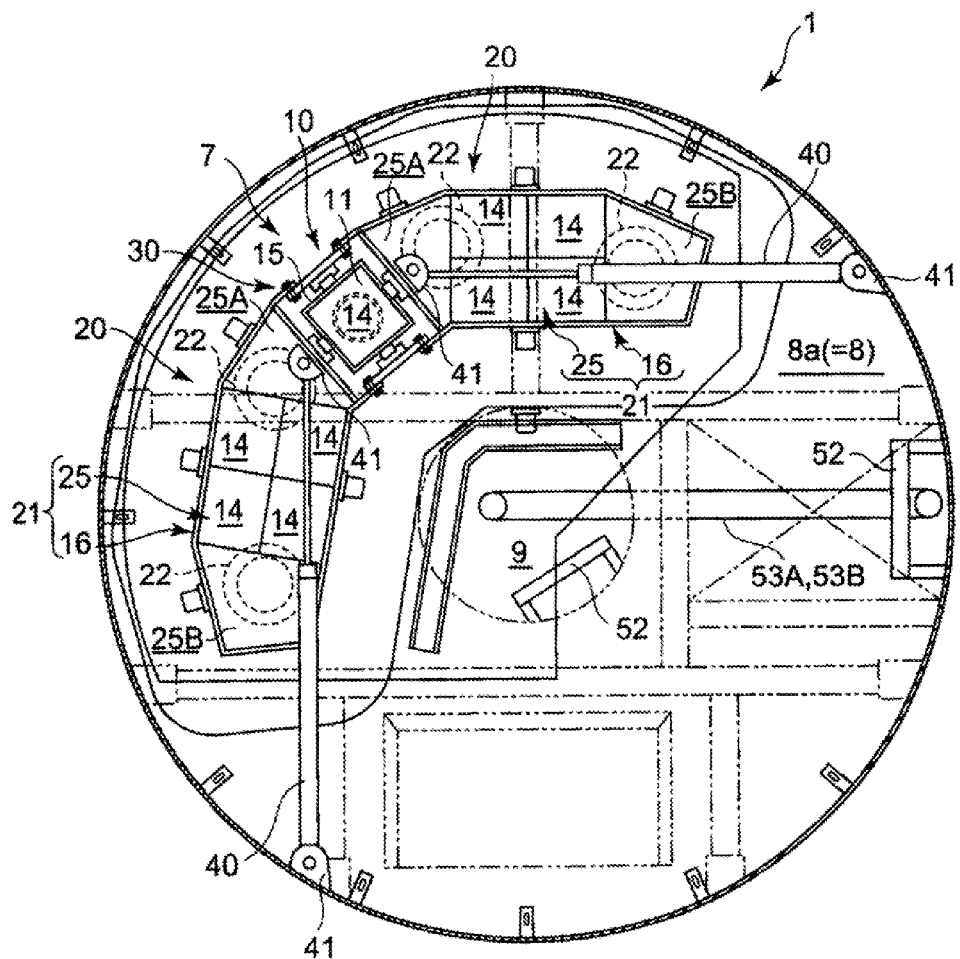
FIG. 2 is a fragmentary view taken along the line A-A of FIG. 1.
Figure 3A:
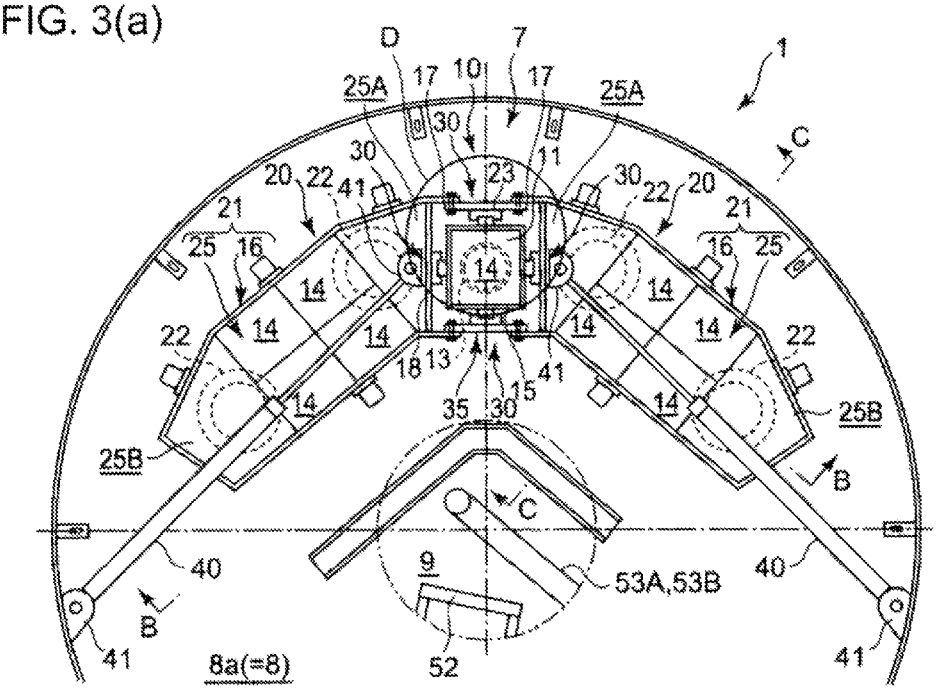
FIG. 3(a) is an enlarged view near a vibration control apparatus of FIG. 2.
Figure 3B:
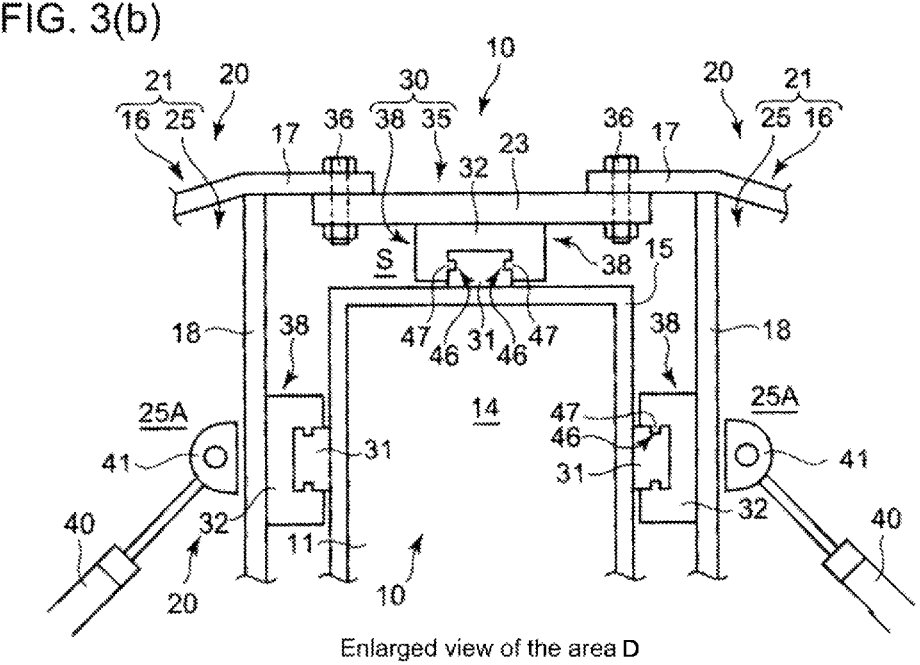
FIG. 3(b) is an enlarged view of the area D of FIG. 3(a).
Figure 4:
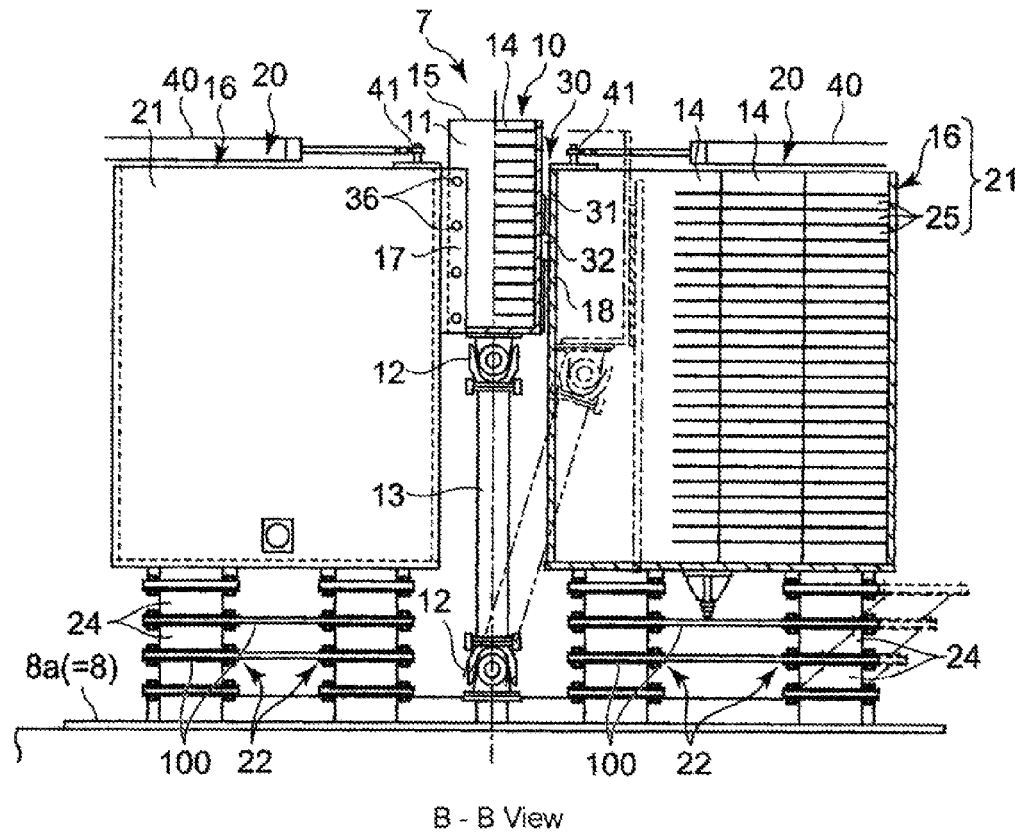
FIG. 4 is a fragmentary view taken along the line B-B of FIG. 3(a) showing a side view on a left-hand side and a sectional view on a right-hand side.
Figure 5:
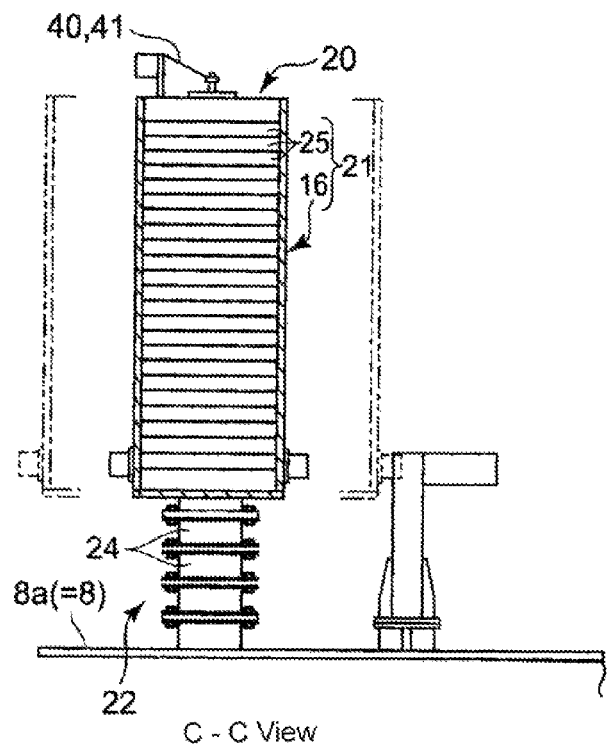
FIG. 5 is a fragmentary view taken along the line C-C of FIG. 3(a).

FIG. 2 is a fragmentary view taken along the line A-A of FIG. 1. FIG. 3(a) is an enlarged view near a vibration control apparatus of FIG. 2. FIG. 3(b) is an enlarged view of the area D of FIG. 3(a). FIG. 4 is a fragmentary view taken along the line B-B of FIG. 3(a) showing a side view on a left-hand side and a sectional view on a right-hand side. FIG. 5 is a fragmentary view taken along the line C-C of FIG. 3(a). As shown in FIG. 2 to FIG. 5, the vibration control apparatus 7 includes a first vibration system 10, a pair of second vibration systems 20, a restraining unit 30 and a pair of dampers 40.

The first vibration system 10 has a supporting bar 13 which is installed upright on a top surface of the upper floor 8a via a universal joint 12 and a first weight which is installed to an upper end of the support bar 13 via a universal joint 12.

The upper and lower ends of the support bar 13 are connected to the first weight 11 and the upper floor 8a via the universal joints 12 respectively. Thus, the first vibration system 10 is in an inverted-pendulum state and does not stand on its own and is unstable.

The supporting bar 13 is a bar-shaped member which extends in a vertical direction in a stationary state. For instance, the bar-shaped member may be a hollow cylindrical steel pipe, a H-shaped pipe or the like.

The first weight 11 is connected to the upper end of the supporting bar 13. The first weight 11 includes a first container 15 and a plurality of weight pieces 14 which are stacked and housed in the first container 15. The first container 15 has a tubular body whose cross-sectional shape is quadrangular and a bottom plate which covers a hole on a bottom side of the tubular body.

The weight piece 14 has a plate-like shape and has the same horizontal-sectional shape as an inner periphery of the first container 15. The weight pieces 14 are interconnected with each other by a linking member (unshown) so that the weight pieces 14 are fixed to one another without moving relative to one another.

The pair of second vibration systems 20 are provided on both sides of the first vibration system in the circumferential direction of the tower 3, e.g. on left and right sides of the first vibration system 10 as shown in FIG. 3(a).

Each of the second vibration systems includes a second weight 21 and a pair of elastic members 22 which are provided on the top surface of the upper floor 8a and support the second weight 21. The pair of elastic members 22 are coupled by a coupling member 100. The second weight 21 is supported by the pair of elastic members 22. Thus, the second vibration system 20 is in an inverted-pendulum state but capable of standing on its own in a stable manner.

The stable second vibration system 20 and the unstable first vibration system 10 are combined to form the vibration control apparatus 7 with a stable vibration system structure.

Each of the elastic members 22 is a laminated rubber formed by layering a plurality of rubbers 24 having a cylindrical shape. A supporting area and a rubber thickness and so on are set to be capable of vibrating the first and second weights 11 and 21 in a desired oscillation cycle. The supporting area herein means an area of an overlapping portion of the rubbers 24 stacked in a vertical direction.

The second weight 21 is a column-shaped body and has a cross-sectional shape of approximately rectangle. The second weight 21 has a second container 16 with a bottom and a plurality of weight pieces 25 which are stacked in the second container 16.

At a corner part of each of the second containers 16 on a side nearer to the first weight 11, an extension part 17 extends along the circumferential direction of the tower 3.

The weight pieces 25 include the weight pieces 14 which form the first weight 11 as described above. In the preferred embodiment, the weight piece 25 is formed such that four of the weight pieces 14 and weight pieces 25A and 25B are arranged on the same plane. The weight pieces 25A and 25B have different horizontal sectional shape than the weight pieces 14. The weight piece 25, in a state that the weight pieces 14, 25A and 25B are connected, has a shape that is the same as the horizontal sectional shape of the inner periphery of the second container 16. The weight pieces 25A and 25B may have the linking members on top and bottom surfaces to connect the weight pieces 25a and 25B with another set of the weight pieces 25A and 25B respectively. The linking members are as described above and unshown in the drawing.

In the preferred embodiment, the plate-like weight pieces 14, the weight pieces 25a and 25B are used. However, the shape of the weight pieces is not limited to this and may be a rectangular column or the like.

The weight piece 14 can be used for both the first and second weights 11 and 21. Thus, the weight pieces 14 of the first weight 11 and the weight pieces 14 of the second weight 21 are interchangeable. It is possible to move some of the weight pieces 14 from one of the first and second weights 11 and 21 to the other of the first and second weights 11 and 21 so as to change the weight ratio of the first and second weights 11 and 21. In this manner, it is possible to change the natural frequency of the vibration control apparatus 7, which is described later in details.

The restraining unit 30 includes a frame 35 surrounding the first weight 11 and a plurality of sliding members installed between the first weight 11 and the frame 35.

The frame 35 is formed by a side panel 18 of the second container 16 on a side nearer to the first weight 11, the extension part 17 of the second container 16 and a plate-like connection member 23 which connects the extension parts 17 and 17 of the pair of neighboring second vibration systems 20 and 20. The frame 35 is formed integrally with the second weight 21. The extension part 17 and the connection member 23 are connected by bolts 36.

In the preferred embodiment, the exemplary case where the frame 35 is formed by the side panel 18 of the second container 16, the extension part 17 and the connection member 23 is explained. However, this is not limitative and the frame 35 may be formed by a rectangular cylindrical member. In such case, a pair of opposing lateral surfaces of the rectangular cylindrical member are respectively fixed to the side panels 18 of the neighboring second containers 16 by the bolts so as to form the frame 35 integrally with the second weight 21.

The plate-like sliding members 38 of the restraining unit 30 are arranged so that the lateral surfaces are in contact with the outer periphery of the first container 15 and the inner periphery of the frame 35.

In the preferred embodiment, a linear guide which is a linear motion bearing is used as the sliding member 38.

The linear guide is formed by a guide 31 and a sliding part 32. The guide 31 is installed to the outer periphery of the first weight 11 along the vertical direction. The sliding part 32 is installed to the inner periphery of the frame 35. The guide 31 is formed into a shape of a rectangular rod and has a pair of grooves 46 formed along the longitudinal direction on a pair of opposing lateral surfaces. The sliding part 32 has a pair of projections 47 which are engageable with the pair of grooves 46 of the frame 31. The sliding part 32 is slidable along the guide 31 in a state where the pair of projections 47 engage with the pair of grooves 46.

In this manner, the first weight 11 to which the guide 31 is installed slides smoothly in the vertical direction relative to the frame 35 to which the sliding part 32 is installed.

It is also possible to provide a friction reduction plate such as a linear ball guide and an oilless plate in an end part of the guide body on the sliding part 32 side. The linear ball guide is configured such that a plurality of spherical rolling elements are embedded turnably in an end part of the guide body on a side of the sliding part 32.

In the preferred embodiment, the guide 31 is installed to the first weight 11 and the sliding part 32 is installed to the second weight 21. However, this is not limitative and it is possible to install the guide 31 to the second weight 21 and the sliding part 32 to the first weight 11.

As described above, the sliding members 38 are arranged around the first weight 11 and are surrounded by the frame 35 integrally formed with the second weight 21. Thus, the first and second weights 11 and 21 move together in the same direction on the same horizontal plane.

The sliding members 38 are installed between the first weight 11 and the frame 35. Thus, the first weight 11 slides in the vertical direction relative to the second weight 21 with which the frame 35 is formed integrally.

Specifically, the first and second vibration systems 10 and 20 are integrated such as to restrain a degree of horizontal-movement freedom without restraining a degree of vertical-movement freedom.

Figures 6, 7:
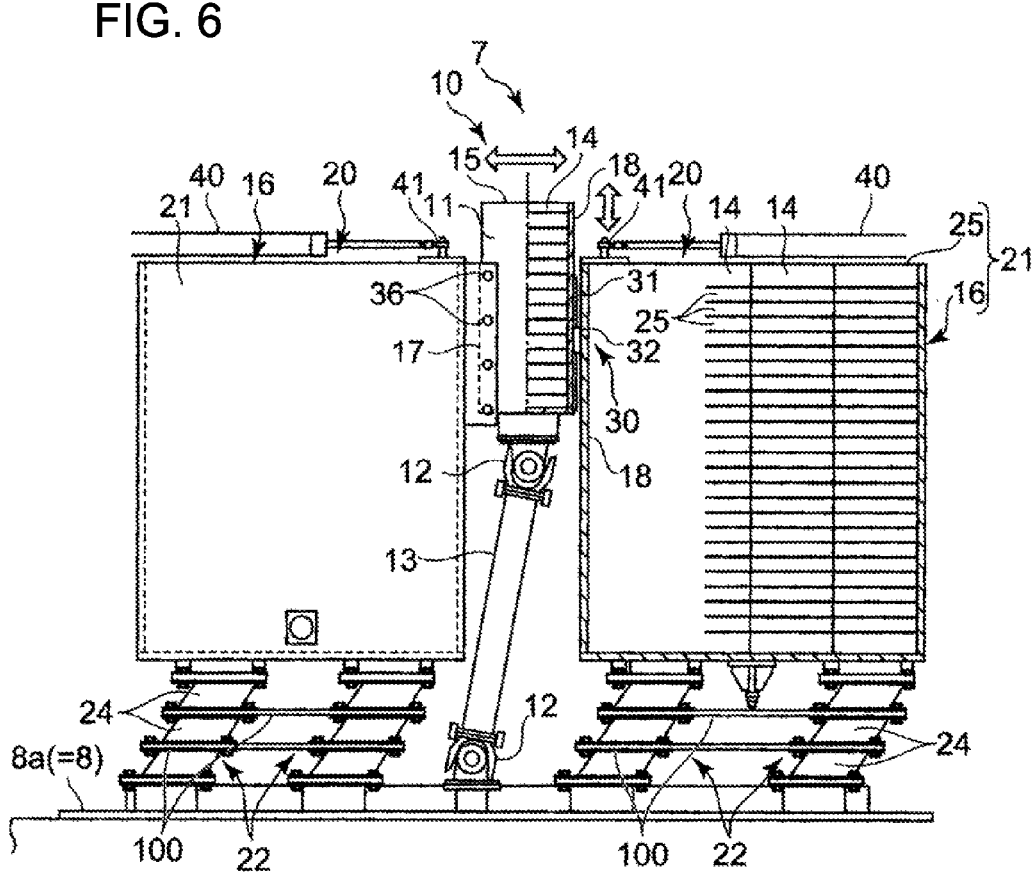
FIG. 6 is a view shooing an operation of the vibration control apparatus in relation to a preferred embodiment of the present invention.
FIG. 7 is a table showing an example case of a relationship among a first weight, a second weight and a natural frequency of the vibration control apparatus.

As shown in FIG. 6, the first weight 11 and the second weight 21 move together on the same horizontal plane in the same direction and the first weight 11 moves relative to the second weight 21 in the vertical direction.

The vibration control apparatus 7 also includes the pair of dampers 40. One end of each of the dampers 40 is connected to an inner wall of the tower 3 via a bracket 41 and other end of each of the dampers 40 is connected to the upper end of the second weight via a bracket 41.

The pair of dampers 40 are arranged at right angles to each other so as to enhance the damping effect in every direction in the horizontal direction. The dampers 40 may be oil dampers, viscoelastic dampers or the like In the preferred embodiment, the dampers 40 are used. However, this is not limitative and it is possible to increase friction resistance of the linear guide of the sliding member 38 so as to absorb energy of vibration by the increased friction.

As described above, according to the vibration control apparatus 7 of the preferred embodiment, the weight ratio of the first weight 11 and the second weight 21 can be changed. For instance, the weight ratio is changed by removing the weight pieces 14 of the first weight 11, by removing the weight pieces 14, 25A and 25B of the second weight 21, by removing the weight pieces 14 of the first weight 11 and adding the removed weight pieces 14 to the second weight 21, or by removing the weight pieces 14 of the second weight 21 and adding the removed weight pieces 14 to the first weight 11. The weight ratio of the first weight 11 and the second weight 21 is changed to adjust the natural frequency of the vibration control apparatus 7. The results of adjusting the natural frequency are described below.

The natural frequency of the vibration control apparatus 7 in relation to the present invention is calculated according to the formula (1) below.

$$f = \frac{1}{2\pi}\sqrt{\frac{kl - m_2 g}{(m_1 + m_2)l}} \quad \text{[Formula 1]}$$

Herein, f is a natural frequency (Hz), k is a constant of spring of the elastic member 22 (N/m), l is a distance (m) between a rotation center of the universal coupling on the upper side and a rotation center of the universal coupling 12 on the lower side, $m_1$ is a weight (kg) of the first weight 11 and $m_2$ is a weight (kg) of the second weight 21.

The formula (1) is used to calculate the natural frequency in the case where the weight of the first weight 11 is reduced per 1000 kg and the weight of the second weight 21 is increase per 1000 kg while the total weight (10000 kg) of the first and second weights 21 is kept the same.

FIG. 7 is a table showing an example case of a relationship among the first weight 11, the second weight 21 and the natural frequency of the vibration control apparatus 7.

As shown in FIG. 7, when the first weight 11 is 10000 kg and the second weight 21 is 0 kg, the natural frequency of the vibration control apparatus 7 is 1.000 Hz.

Then the weight of the first weight 11 is reduced gradually and the weight of the second weight 21 is increased by adding the reduced weight of the first weight 11. For instance, the weight pieces 14 of the first weight 11 are removed gradually and the removed weight pieces 14 are added to the second weight 21. In this manner, the natural frequency of the vibration control apparatus 7 decreases gradually.

Finally, when the first weight 11 is 1000 kg and the second weight 21 is 9000 kg, the natural frequency of the vibration control apparatus 7 is 0.743 Hz.

According to the above results, it is confirmed that the cycle of the vibration control apparatus 7 is lengthened by gradually reducing the weight of the first weight 11 and gradually increasing the weight of the second weight 21 by adding the reduced weight of the first weight 11.

According to the vibration control apparatus 7 in each of the preferred embodiments, the first weight 11 and the second weight 21 are supported from underneath by the supporting bar 13 and elastic member 22 respectively. Thus, it is possible to control the height of the device in comparison to the conventional control apparatus having the pendulum-type damping unit in which the weight is suspended from the structure via the suspension member and the inverted-pendulum damping unit in which another weight is supported by the supporting bar.

The first vibration system 10 and the second vibration system 20 can be manufactured by using general parts without using special materials and thus, the control apparatus 7 can be manufactured at low cost.

By installing the vibration control apparatus 7 to the wind turbine generator 1, the first natural vibration of the tower 3 due to the rotation of the rotor 5 of the wind turbine generator 1 can be damped. Therefore, the wind turbine generator 1 having the hub 5A which is over 100 m height is easily achievable without increasing the weight and a wall thickness of the tower 3.

The sliding members 38 are provided between the frame 35 of the second weight 21 and the first weight 11 so that the second weight 21 moves smoothly relative to the first weight 11 in the vertical direction. The frame 35 of the second weight 21 surrounds the first weight 11 and thus, the first weight 11 and the second weight 21 move together in the same direction on the same horizontal plane. In this manner, the first weight 11 and the second weight 21 move together in the same direction on the same horizontal plane and the first weight moves relative to the second weight in the vertical direction.

At least one of the first and second weights 11 and 21 is formed by a plurality of weight pieces 14, 25A and 25B which are detachable. For instance, the weight pieces 14 of one of the first and second weights 11 and 21 are moved to the other of the first and second weights 11 and 21 so as to change the weight ratio of the first and second weights 11 and 21. In this manner, the natural frequency of the vibration control apparatus 7 is adjusted.

For instance, when the first natural frequency of the tower 3 varies in installation stages such as structuring the tower 3 and installing the nacelle 4 to the tower 3, the vibration control apparatus 7 can adjust the natural frequency. Thus, it is possible to efficiently damp the vibration occurring in each stage by installing the vibration control apparatus 7 in the stage of structuring the tower 3.

The pair of the second vibration systems 20 are provided on both sides of the first vibration system 10 in the circumferential direction of the tower 3. By this, the vibration control apparatus 7 is formed into an arc shape and can be arranged between the outer periphery of the opening 9 formed in the center of the tower and the inner wall of the tower 3.

One end of the damper 40 is connected to the tower and other end of the damper 40 is connected to the second weight 21 so as to increase the damping effect on the vibration of the first and second weights 11 and 21. The damper 40 is arranged horizontally and thus, it is possible to enhance the damping effect on the horizontal vibration.

The vibration control apparatus 7 is provided on the upper floor 8a of the tower 3. In comparison to the case of the vibration control apparatus 7 being installed on a middle floor or a lower floor 8 of the tower 3, it is possible to efficiently damp the first natural vibration of the tower 3.

A second preferred embodiment of the present invention is now described. In the following explanations, components already described in the first preferred embodiment are denoted by the same reference numerals, and thus detailed description thereof are omitted and mainly differences are described hereinafter.

Figure 8A:
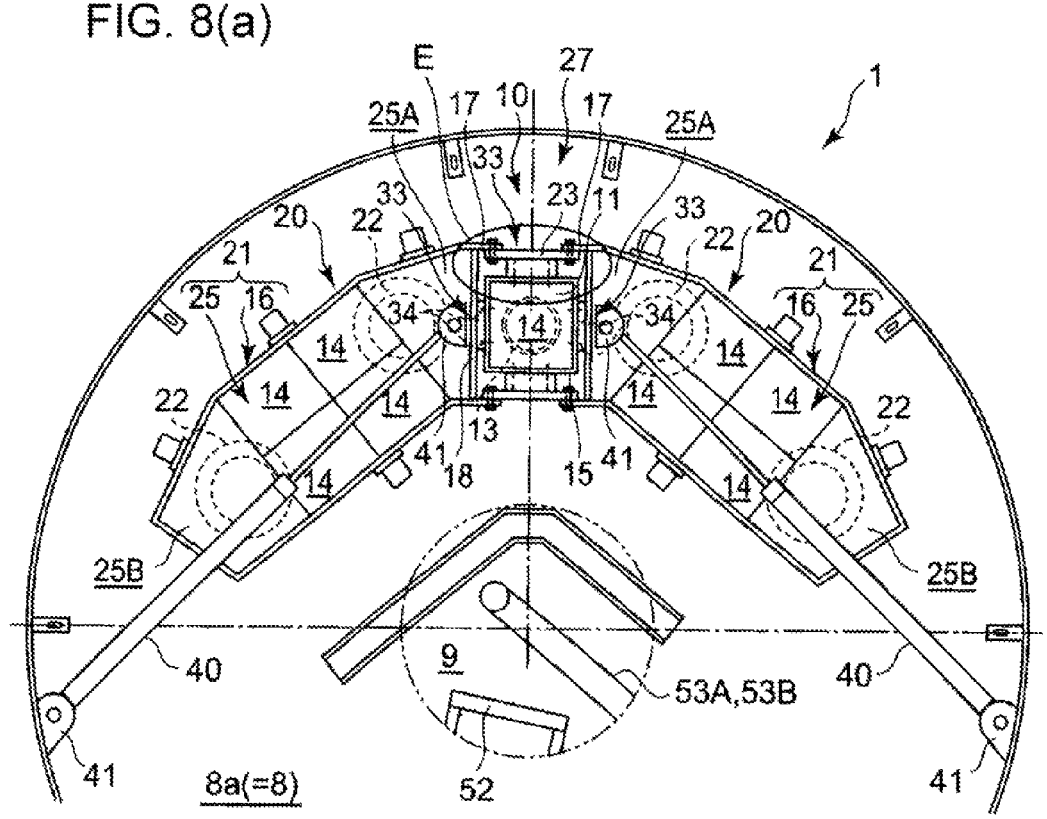
FIG. 8(a) is a plane view of a vibration control apparatus in relation to a second preferred embodiment of the present invention.
Figure 8B:
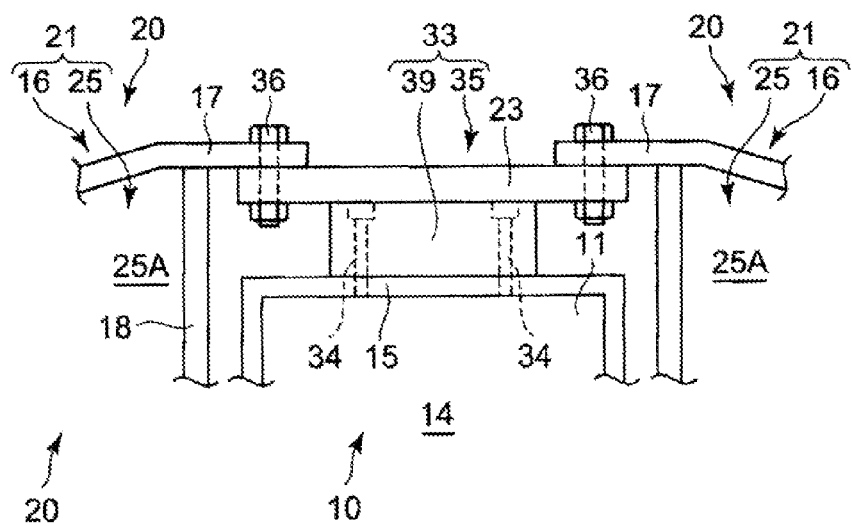
FIG. 8(b) is an enlarged view of the area E of FIG. 8(a).

FIG. 8(a) is a plane view of a vibration control apparatus 27 in relation to the second preferred embodiment of the present invention. FIG. 8(b) is an enlarged view of the area E of FIG. 8(a).

As shown in FIG. 8, the vibration control apparatus 27 in relation to the second preferred embodiment of the present invention includes a restraining unit 33 that is different from the vibration control apparatus 7 of the first preferred embodiment.

The restraining unit 33 includes the frame 35 and a plurality of sliding members 39. The sliding members 39 are provided in contact with the outer periphery of the first weight 11 and the inner periphery of the frame 35. In the second preferred embodiment, oilless plates made of fluorine resin are used as the sliding members 39. The oilless plates are fixed to lateral surfaces of the outer periphery of the first weight 11 by bolts 34. The oilless plate may be oil impregnated sintered alloy which is produced by combining special sintered alloy and a steel back plate and contains lubricating oil which is supplied across a sliding surface with a sliding thereof.

In the preferred embodiment, the exemplary case of using the oilless plate made of fluorine resin is described. However, this is not limitative and it is also possible to use a plate made of polyimide resin or the like.

In the preferred embodiment, the exemplary case of installing the oilless plate to the first weight 11 is described. However, this is not limitative and it is also possible to install the oilless plate to the second weight 21.

According to the vibration control apparatus 27 as described above, the sliding members 39 are arranged around the first weight 11 and surrounded by the frame 35 formed integrally with the second weight 21. Thus, the first and second weights 11 and 21 move together in the same direction on the same horizontal plane. The first weight 11 to which the sliding members 39 are installed moves smoothly relative to the second weight 21 in the vertical direction. As a result, the first weight 11 and the second weight 21 moves together in the same direction on the same horizontal plane and the first weight 11 moves relative to the second weight 21 in the vertical direction.

A third preferred embodiment of the present invention is described below.

Figure 9:
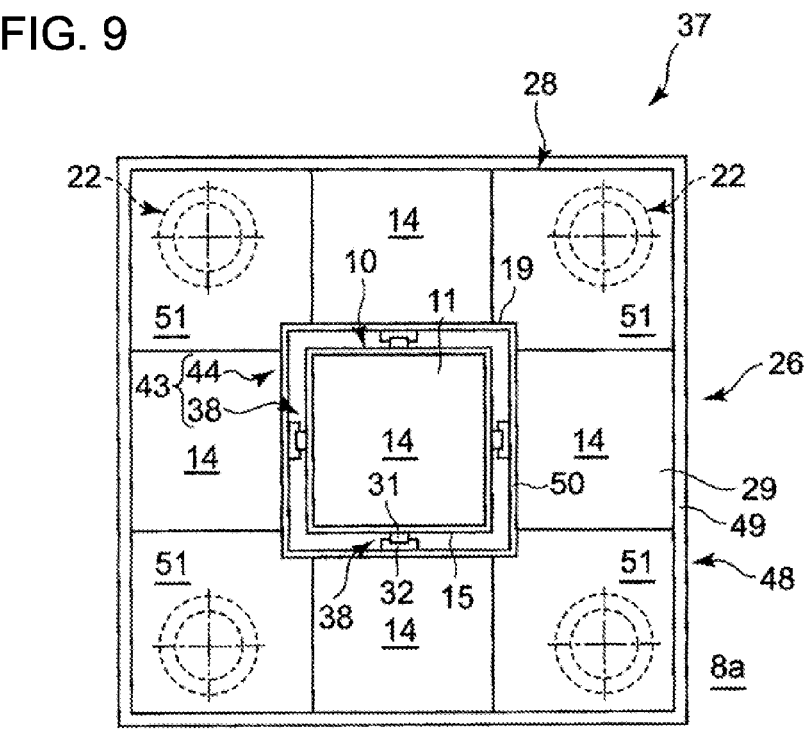
FIG. 9 is a plane view of a vibration control apparatus in relation to a third preferred embodiment of the present invention.
Figure 10:
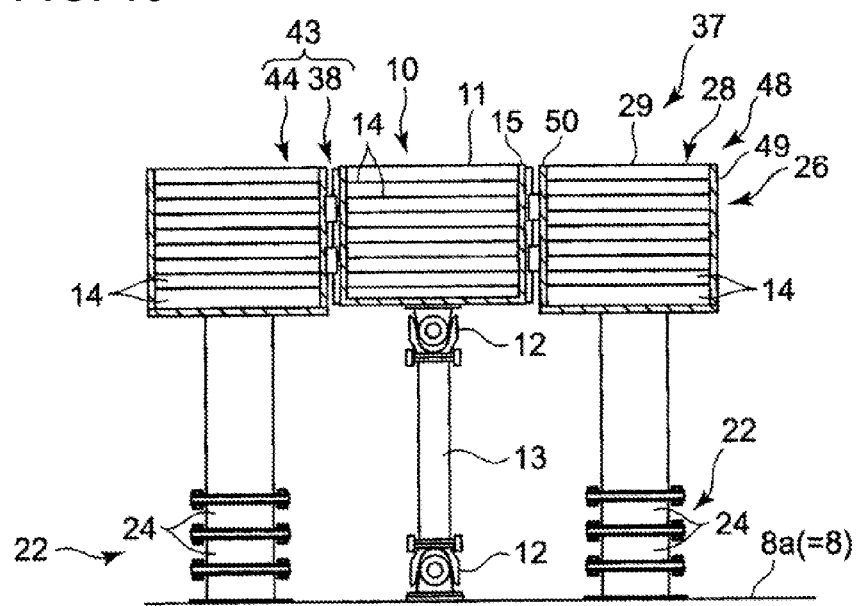
FIG. 10 is a side view of the vibration control apparatus in relation to the third preferred embodiment of the present invention.

FIG. 9 is a plane view of a vibration control apparatus 37 in relation to the third preferred embodiment of the present invention. FIG. 10 is a side view of the vibration control apparatus 37 in relation to the third preferred embodiment of the present invention.

As shown in FIG. 9 and FIG. 10, the vibration control apparatus 37 in relation to the third preferred embodiment includes a second vibration system 26 and a restraining unit 43 that are different from the vibration control apparatus 7 and 27 of the first and second preferred embodiments.

The second vibration system 26 includes a second weight 29 surrounding the first weight 11 and a plurality of elastic members 22 supporting the second weight 29.

The second weight 29 is configured by a third container 48 and a plurality of weight pieces 28 which are stacked and housed in the third container 48.

The third container 48 includes a rectangular outer cylinder 49, a rectangular inner cylinder 50 installed in the outer cylinder 49 and a bottom plate covering a lower end of a space formed between the outer cylinder 49 and the inner cylinder 50. The weight pieces 28 are stored in the space.

The weight pieces 28 are formed into the same shape as the horizontal sectional shape of the inner periphery of the third container 48. The weight pieces 28 include the weight pieces 14 of the first weight 11. In the preferred embodiment, the weight pieces 28 is formed such that four of the weight pieces 14 and weight pieces 51 having a different horizontal sectional shape from the weight pieces 14 are arranged in the same plane. The weight pieces 14 of the second weight 29 and the weight pieces 14 of the first weight 11 are interchangeable.

The restraining unit 43 includes a frame 44 surrounding the first weight 11 and the plurality of sliding members 38.

In the preferred embodiment, the inner cylinder 50 of the second weight 29 is used as the frame 44. It is also possible to provide a separate rectangular cylindrical member as the frame 44. In such case, the outer periphery of the frame 44 is fixed to the inner periphery of the inner cylinder 50 of the second weight 29 by a bolt or the like so as to integrate the frame 44 with the second weight 29.

According to the vibration control apparatus 37 as described above, the sliding members 38 are arranged around the first weight 11 and surrounded by the second weight 29. Thus, the first and second weights 11 and 29 move together in the same direction on the same horizontal plane. The first weight 11 to which the sliding members 38 are installed moves smoothly relative to the second weight 29 in the vertical direction. As a result, the first weight 11 and the second weight 29 move together in the same direction on the same horizontal plane and the first weight 11 moves relative to the second weight 29 in the vertical direction.

A fourth preferred embodiment of the present invention is described below.

Figure 11:
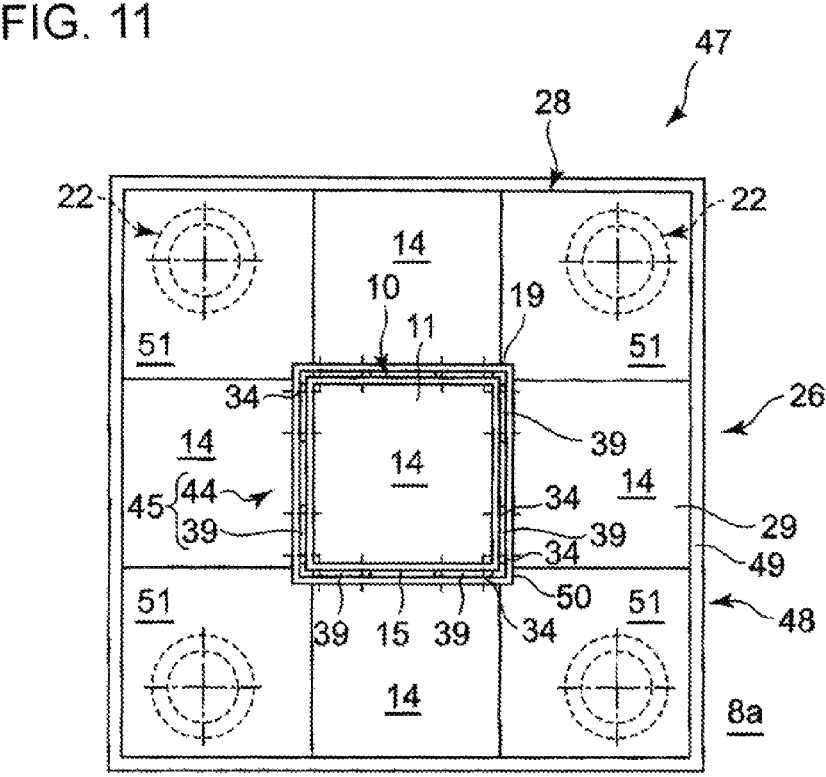
FIG. 11 is a plane view of a vibration control apparatus in relation to a fourth preferred embodiment of the present invention.
Figure 12:
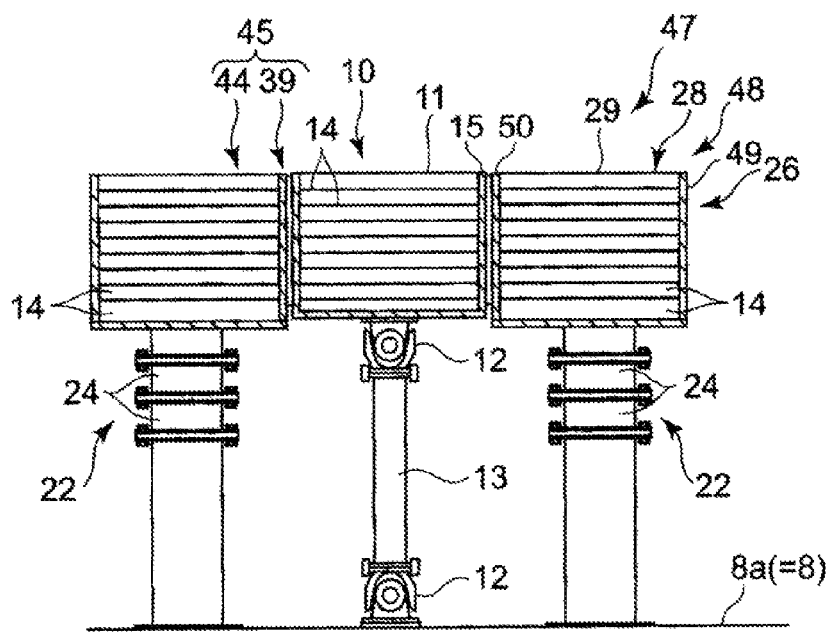
FIG. 12 is a side view of the vibration control apparatus in relation to the fourth preferred embodiment of the present invention.

FIG. 11 is a plane view of a vibration control apparatus 47 in relation to the fourth preferred embodiment of the present invention. FIG. 12 is a side view of the vibration control apparatus 47 in relation to the fourth preferred embodiment of the present invention.

As shown in FIG. 11 and FIG. 12, the vibration control apparatus 47 in relation to the fourth preferred embodiment includes a restraining unit 45 which is different from the vibration control apparatus 37 of the third preferred embodiment.

The restraining unit 45 includes a plurality of sliding members 39 installed between the first weight 11 and the frame 44.

In the same manner as the second preferred embodiment, oilless plates are used as the sliding members 39. The oilless plates are fixed to the lateral surface of the first weight 11 by bolts 34.

According to the vibration control 47 described above, the sliding members 39 are arranged around the first weight 11 and surrounded by the second weight 29. Thus, the first and second weights 11 and 29 move together in the same direction on the same horizontal plane. The first weight 11 to which the sliding members 39 are installed moves smoothly relative to the second weight 29 in the vertical direction. As a result, the first weight 11 and the second weight 29 moves together in the same direction on the same horizontal plane and the first weight 11 moves relative to the second weight 29 in the vertical direction.

In each of the preferred embodiments described above, the exemplary case where the first weight 11 is formed into a rectangular column is described. However, this is not limitative and the first weight 11 may be formed into any polygonal columns such as a triangular column and a pentangular column. The first weight 11 may be formed in a column or an elliptic column as well. In such case, the frame 35, 44 is a cylindrical member which has polygonal or cylindrical shape formed along the outer periphery of the first weight 11.

REFERENCE SIGNS LIST

1 Wind turbine generator
2 base
3 tower
4 nacelle
5 rotor
5A hub
5B blade
7, 27, 37, 47 Vibration control apparatus
8 floor
8a upper floor
9 opening
10 first vibration system
11 first weight
12 universal joint
13 supporting bar
14 weight piece
15 first container
16 second container
17 extension part
18 side panel
20, 26 second vibration system
21, 29 second weight
22 elastic member
23 connection member
24 rubber
25, 28 weight piece
25A, 25B weight piece
30, 33, 43, 45 restraining unit
31 guide
32 sliding part
34, 36 bolt
35, 44 frame
38, 39 sliding member
40 damper
41 bracket
46 groove
47 projection
48 third container
49 outer cylinder
50 inner cylinder
51 weight piece
52 ladder
53A, 53B cable
100 coupling member

The invention claimed is:

1. A vibration control apparatus for a structure, comprising:
a first vibration system which comprises a first weight, a supporting bar installed upright on the structure to support the first weight on the structure, a lower universal joint connecting a lower end of the support bar to the structure and an upper universal joint connecting an upper end of the support bar to the first weight;
a second vibration system which comprises an elastic member installed upright on the structure and a second weight arranged on the elastic member; and
a restraining unit which restrains the first weight with respect to the second weight such that the first and second weights move in the same direction on the same horizontal plane and the first weight moves relative to the second weight in a vertical direction.

2. The vibration control apparatus according to claim 1, wherein the restraining unit comprises:
a frame which surrounds the first weight; and
a plurality of sliding members which are provided between an outer periphery of the first weight and an inner periphery of the frame.

3. The vibration control apparatus according to claim 1, wherein at least one of the first and second weights is formed by a plurality of weight pieces each of which is detachable.

4. The vibration control apparatus according to claim 1, wherein the structure is a wind turbine generator.

5. The vibration control apparatus according to claim 4, wherein the vibration control apparatus is installed in a tower of the wind turbine generator,
wherein a pair of the second vibration systems are provided on both sides of the first vibration system in a circumferential direction of the tower,
wherein a frame and a plurality of sliding members are provided between the pair of the second vibration systems, the frame being integrally formed with the second weight to surround the first weight, each of the sliding members being arranged between the first weight and the frame.

6. The vibration control apparatus according to claim 1, wherein a weight ratio of the first weight to the second weight is changed to adjust a oscillation cycle of a main body of the vibration control apparatus without changing a total weight of the first and second weights.

7. The vibration control apparatus according to claim 1, further comprising:
a damper one end of which is connected to the structure and other end of which is connected to one of the first and second weights.

8. The vibration control apparatus according to claim 7, wherein the damper is arranged horizontally.

9. A wind turbine generator, comprising:
the vibration control apparatus of claim 1.

10. The wind turbine generator according to claim 9, wherein the vibration control apparatus is installed on an upper floor of the tower of the wind turbine generator.

11. A vibration control method for a structure, comprising the steps of:
installing upright a first vibration system comprising a support bar and a first weight on the structure by connecting one end of the support bar to the structure, the supporting bar being connected to a universal joint at both ends of the supporting bar, the first weight being coupled to other end of the support bar via the universal joint;
installing upright a second vibration system comprising an elastic member and a second weight on the structure by connecting one end of the elastic member to the structure, the second weight being connected to other end of the elastic member;
restraining the first weight with respect to the second weight by a restraining unit; and
when the structure shakes, oscillating the first and second weights such that the first and second weights move in the same direction on the same plane and the first weight moves relative to the second weight in a vertical direction.

12. The vibration control method according to claim 11, wherein at least one of the first and second weights is formed by a plurality of weight pieces each of which is detachable, and
wherein the vibration control method comprises the step of:
changing a number of the weight pieces of at least one of the first and second weights to change a weight ratio of the first weight to the second weight.

* * * * *